(12) United States Patent
Guerster (10) Patent No.: US 9,266,552 B2
(45) Date of Patent: Feb. 23, 2016

(54) STEERING SYSTEM FOR WHEELED LAND VEHICLE

(71) Applicant: Rene Guerster, Casselberry, FL (US)

(72) Inventor: Rene Guerster, Casselberry, FL (US)

( * ) Notice: Subject to any disclaimer, the term of this patent is extended or adjusted under 35 U.S.C. 154(b) by 74 days.

(21) Appl. No.: 14/083,540

(22) Filed: Nov. 19, 2013

(65) Prior Publication Data

US 2015/0034407 A1 Feb. 5, 2015

Related U.S. Application Data

(60) Provisional application No. 61/862,120, filed on Aug. 5, 2013.

(51) Int. Cl.
| | | |
|---|---|---|
| *B62D 5/00* | (2006.01) | |
| *B62D 1/12* | (2006.01) | |
| *B62D 5/04* | (2006.01) | |
| *B62D 6/00* | (2006.01) | |

(52) U.S. Cl.
CPC . *B62D 1/12* (2013.01); *B62D 6/002* (2013.01)

(58) Field of Classification Search
CPC .................................. B62D 1/12; B62D 6/002
See application file for complete search history.

(56) References Cited

U.S. PATENT DOCUMENTS

| | | | |
|---|---|---|---|
| 6,279,675 | B1 | 8/2001 | Bohner |
| 6,308,122 | B1 | 10/2001 | Nishizaki |
| 6,360,151 | B1 | 3/2002 | Suzuki |
| 6,367,577 | B2 | 4/2002 | Murata |
| 6,442,462 | B1 | 8/2002 | Nishizaki |
| 6,799,105 | B2 | 9/2004 | Stout |
| 6,886,656 | B2 | 5/2005 | Fujioka |
| 6,899,196 | B2 | 5/2005 | Husain |
| 7,004,279 | B2 | 2/2006 | Shitamitsu |
| 7,174,987 | B2 | 2/2007 | Husain |
| 7,363,134 | B2 | 4/2008 | Mitsuhara |
| 7,604,089 | B2 | 10/2009 | Hidaka |
| 7,837,004 | B2 | 11/2010 | Yashuda |
| 7,860,624 | B2 | 12/2010 | Kubota |
| 7,913,803 | B2 | 3/2011 | Hidaka |
| 8,028,789 | B2 | 10/2011 | Huang et al. |
| 8,036,793 | B2 | 10/2011 | Auguet |
| 2010/0070137 | A1 | 3/2010 | Yamaguchi |
| 2011/0313620 | A1 | 12/2011 | Mukai |

*Primary Examiner* — Paul N Dickson
*Assistant Examiner* — Joselynn Y Sliteris
(74) *Attorney, Agent, or Firm* — Howson & Howson LLP (57) ABSTRACT

A wheeled vehicle is steered by a yoke or other operator control the movement of which is limited so that the operator's hands need not change position on the control. The steering is under the control of a microprocessor responsive to an input from the control, the vehicle's speedometer, and to accelerometers responsive to forces acting on the vehicle laterally and perpendicular to the roadway. The relationship between the position of the steerable wheels and the displacement of, or force applied to, the operator control is a function that depends on the magnitude of the displacement or force, speed, and one or more time derivatives of the displacement of, or force on, the operator control. The relationship between the position of the steerable wheels and the displacement of, or force on, the control is overridden when the lateral force is such that the vehicle is in danger of rolling over.

18 Claims, 4 Drawing Sheets

STEERING SYSTEM FOR WHEELED LAND VEHICLE

CROSS REFERENCE TO RELATED APPLICATIONS

This application claims the benefit of Provisional Application 61/862120, filed Aug. 5, 2013, and incorporates the entire disclosure of Provisional Application 61/862120 by reference.

FIELD OF THE INVENTION

This invention relates generally to the steering of wheeled land vehicles, and particular to a novel steering control system that enables an operator to maintain better control of a vehicle.

BACKGROUND OF THE INVENTION

With the invention of powered land vehicles in the late nineteenth century, steering control became a serious design consideration. The use of a wheel for land vehicle steering originated in nautical applications in the early 1700s when the "whipstaff" helms used until then failed to provide sufficient rudder angles as the ships gained size and weight. Whipstaff helms were replaced by wheels that operated the rudder using rope, drum and pulley systems. Early automobiles utilized a tiller for steering. However, in 1894 a Panhard et Levassor vehicle was fitted with the first known adaptation of a steering wheel, starting the trend that has been carried on to the present time.

The steering wheels of the early twentieth century were large and required significant strength to effect the necessary driving control, as early cars were quite heavy. A brief interlude in wheel use took place in the first decade when electric cars made their appearance. Because of their light weight they could use a relatively long horizontal arm mounted to a vertical spindle and pushed to turn left or pulled to turn right. However, the advent of Henry Ford's model T in 1908, with its advanced metallurgy, engineering, simplicity and light weight, cemented the steering wheel's prominence.

Power steering replaced manual steering in the mid twentieth century, alleviating the difficulty of turning a steering wheel especially at low driving speeds. However the steering ratio, i.e., the number of turns of the steering wheel needed to adjust the direction of the front wheels of an automobile through a given angle, underwent little if any change. Even in a modern, automobile with power steering, the steering wheel typically rotates about 2.5 full turns (90°) lock to lock, adjusting the angle of the front wheels of the automobile through about 90° (45° to either side of a neutral position).

In modern automobiles as in early manually steered automobiles, because of the approximately 900° range of rotation of the steering wheel, execution of a turn typically requires a complex "hand over hand" manipulation in which the driver's hands alternately release the wheel and are moved from one position to another. (The term "hand over hand" is also intended to encompass any of several variations of an intermittent, repeated, steering manipulation, such as one in which, while a first hand firmly grips the wheel, the second hand is slid toward the first hand, and then grips and rotates the wheel, moving away from the first hand causing the rim of the wheel to slide relative to the first hand while the grip of the first hand on the wheel is loosened.) Although the skill to carry out these movements can be acquired by most people, the manipulation is not necessarily intuitive, and for many people it takes a significant amount of time to become comfortably accustomed to steering wheel operation.

Variable gain, speed-dependent, steering controls have been proposed, and some examples are described in the following United States patents and published patent applications:

| | |
|---|---|
| 6,279,695 | Bohner et al. |
| 6,308,122 | Nishizaki et al. |
| 6,367,577 | Murata et al. |
| 6,442,462 | Nishisaki et al. |
| 6,799,105 | Stout et al. |
| 6,886,656 | Fujioka et al. |
| 6,899,196 | Husain et al. |
| 7,004,279 | Shitamitsu et al. |
| 7,174,987 | Husain |
| 7,363,134 | Mitsuhara |
| 7,604,089 | Hidaka et al. |
| 7,837,004 | Yasuda |
| 7,860,624 | Kubota et al. |
| 7,913,803 | Hidaka |
| 8,036,793 | Auguet et al. |
| 2010/0070137 | Yamaguchi et al. |
| 2011/0313620 | Mukai et al. |

Despite the development of these and other sophisticated vehicle steering control systems, none of them offers a satisfactory alternative to "hand over hand" steering wheel manipulation.

Some efforts have been made to develop high gain steering systems, i.e., systems in having a high ratio of the angle of the road engaging wheels to the movement of the steering control, e.g., a "joy stick". However, in most cases, the ratio was constant. In others, the ratio was adjustable. Here again, although the systems did not require hand over hand manipulation, they did not supply a satisfactory alternative.

SUMMARY OF THE INVENTION

The steering system according to this invention, takes advantage of a variable gain, "drive-by-wire" steering system in which the gain, i.e. the ratio of the angle of the steerable, road-engaging, wheels to the control input is dependent on one or more variables from a set of variables including the vehicle's speed, the displacement of, or force applied to a manual operator control, and time derivatives of the manual operator control displacement or force. The variable gain enables the driver to control the vehicle comfortably and accurately while maintaining a continuous, fixed, contacting, relationship between the manual operator control and the operator's hands, eliminating the need for hand over hand manipulation.

In a preferred embodiment, the manual operator control can be a rotatable yoke, having two manually graspable regions on opposite sides of an axis of rotation. The drive-by wire system enables the yoke to steer the steerable road-engaging wheels of the vehicle through a range from about 45° to the left to about 45° to the right, with a range of yoke movement such that operator's hands need not leave the graspable regions of the yoke, i.e., a range of about 90° to either side of a neutral position. In other embodiments, the manual operator control can consist of one or more manually graspable handles, coupled either to position sensors or strain gauges, providing an output which is a function either of manual operator control displacement or the force applied to the manual operator control.

More specifically, in a wheeled vehicle in accordance with the invention, each wheel of a set of steered wheels, is steerable through a limited angular range about a steering axis. The steering system comprises an actuator means connected to the steered wheels for steering each of the steered wheels, a manual operator control graspable by at least one of an operator's left and right hands, an encoder connected to and operable by the manual operator control and providing an output which is a function of an input applied to said manual operator control. The input can be the displacement of, or a force applied manually to, the manual operator control. The system also includes a vehicle speed sensor, and a control unit connected to receive both the output of the encoder and an output of the vehicle speed sensor. The control unit includes a microprocessor and provides a driving output for driving the actuator means.

The relationship between the angle about which each of the steered wheels is steered about its steering axis by the actuator means to the magnitude of the input applied to the manual operator control is a variable dependent upon at least one independent variable including the speed of travel of the vehicle as sensed by the vehicle speed sensor. The input applied to the manual operator control can be varied throughout a range sufficient to cause the steered wheels to be steered through the entirety of their limited angular ranges, at least when the speed of the vehicle is within a range from zero to an intermediate speed, while the operator's hand remains in fixed, contacting, relationship with said manual operator control.

In a preferred embodiment of the invention, the manual operator control is a yoke rotatable about an axis of rotation and having manually graspable areas on opposite sides of the axis of rotation. Preferably, the rotation of the yoke is limited to a range of approximately 90° in both directions from a neutral position, i.e., to a range such that the operator's hands remain at all times substantially on respective opposite sides of an imaginary plane in which said axis of rotation lies.

In a preferred embodiment, the vehicle includes a first accelerometer arranged to provide an accelerometer output representative of the magnitude of the force acting on the vehicle in a lateral direction, and a second accelerometer arranged to provide an accelerometer output representative of the magnitude of the force acting on the vehicle in a direction perpendicular to the lateral direction. Both accelerometers are connected to deliver their accelerometer outputs to the control unit, thereby providing the torque value tending to overturn the vehicle, taking into account any banking of the road surface. The microprocessor of the control unit is programmed to override the driving output of the control unit when the magnitudes of these forces are such that torque acting on the vehicle as a result of the forces exceeds a value that is below a rollover threshold by a predetermined amount.

In the steering system, the relationship between the angle about which each of the steered wheels is steered about its steering axis by the actuator means to the magnitude of the input applied to the manual operator control is preferably a variable dependent not only upon the speed of travel of the vehicle but also on the time rate of change of the magnitude of the input applied to the manual operator control.

Still more preferable is a system in which the relationship between the angle about which each of the steered wheels is steered about its steering axis by the actuator means to the magnitude of the input applied to the manual operator control is a variable also dependent on the second time derivative of the magnitude of the input applied to the manual operator control.

DETAILED DESCRIPTION OF THE PREFERRED EMBODIMENTS

Figure 1:
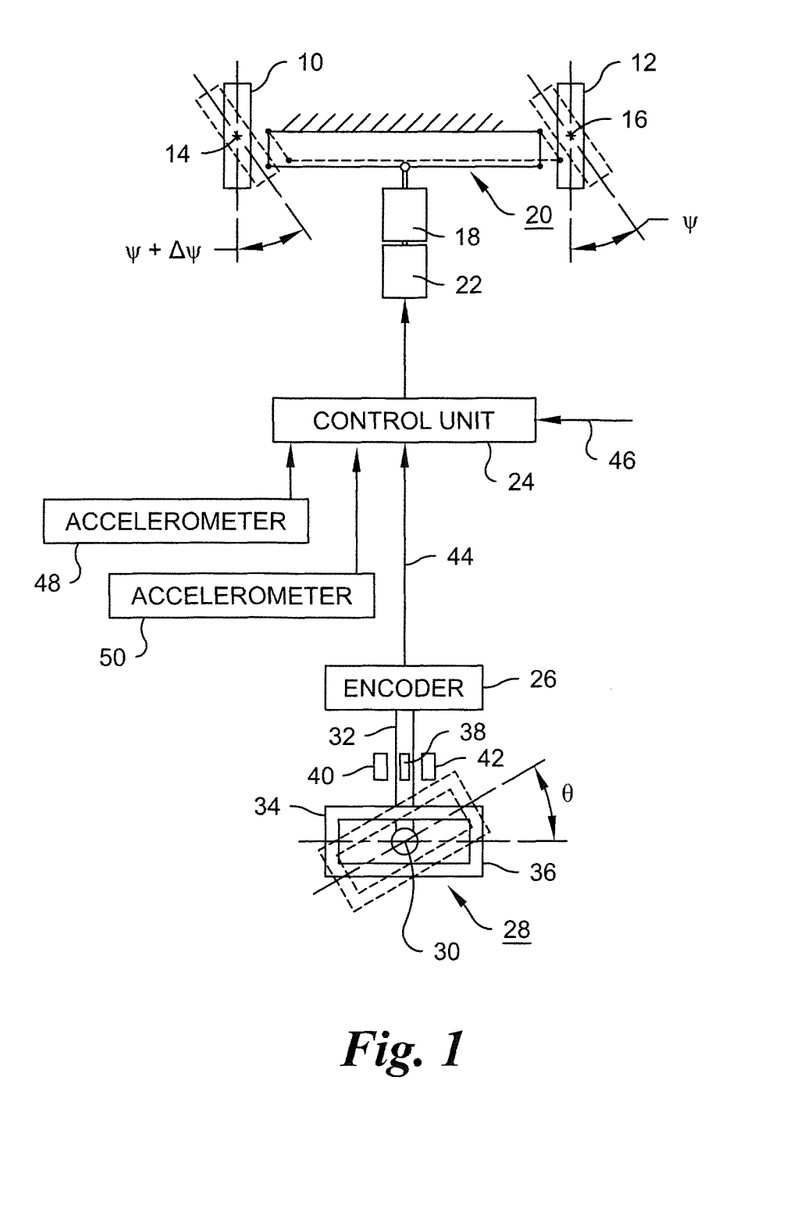
FIG. 1 is a schematic view of a vehicle in accordance with an embodiment of the invention in which steerable, road-engaging, wheels are controlled through a steer-by-wire control system by a manually rotatable steering yoke.

The vehicle depicted schematically in FIG. 1 has left and right steered front wheels 10 and 12, which are respectively steerable about steering axes 14 and 16 by a power steering unit 18 through a linkage 20. What has been described thus far can be the conventional power steering system of any ordinary power steered automobile. The range of steering movement of the front wheels 10 and 12 is limited to approximately 45° to the left and right of a neutral, straight ahead, condition. The positions of the wheels, when steered to the left, are illustrated in broken lines. As shown in FIG. 1, the right front wheel is steered left through an angle $\psi$. For the purpose of this description, the value of $\psi$ is positive for a left turn and negative for a right turn.

The linkage is preferably configured so that in a given turn, the "inside" front wheel is steered at a slightly greater angle than the "outside" front wheel to take into account the fact that the turn radius of the inside wheel is less than that of the outside wheel. Thus, while the right front wheel is steered to the left through an angle $\psi$, the left front wheel in FIG. 1 is steered to the left through an angle $\psi+\Delta\psi$.

The power steering unit 18 is operated by an electric servo motor 22, for example a stepping motor, under the control of an electronic control unit 24, which includes a microprocessor and related input and output components, the output components including servomotor drive circuitry (not shown). The power steering unit 18 and the servo motor 22 together constitute an actuator means for exerting a mechanical force on the steering linkage 20 in response to a command (corresponding to angle $\theta$) supplied to the servomotor by the control unit 24.

The electronic control unit 24 receives several inputs, including an input from an encoder 26 operated by a manual operator control 28. The encoder can be any of a variety of devices that generate an electrical signal representative of, and in response to, a mechanical input. Examples of such encoders include optical encoders, multi-position switches, variable resistances, synchros, and similar devices. In the embodiment shown, the manual operator control 28 is a yoke rotatable about an axis of rotation 30, and connected to operate the encoder 26 through a rotatable shaft 32, which corresponds to a vehicle's steering column. The yoke has two manually graspable regions 34 and 36, on opposite sides of the axis of rotation 30, and graspable respectively by an operator's left and right hands. In broken lines, the yoke is shown rotated through an angle $\theta$, in response to a manual counterclockwise rotation of the yoke by an operator steering the vehicle to the left.

The rotation of the yoke is limited, preferably by the engagement of a projection 38 on the rotatable shaft 32 with mechanical stops 40 and 42 positioned so that the operator can comfortably rotate the yoke in both directions through its full range from a fully clockwise position to a fully counterclockwise position while the operator's hands remain in fixed, contacting, relationship with regions 34 and 36 respectively. Preferably, the range of rotation is limited to approximately 90° in both directions from a neutral position, so that the operator's hands remain substantially on opposite sides of an imaginary vertical plane in which the axis of rotation of the yoke lies. That is, the range of rotation is limited so that the operator's hands do not pass more than a very short distance, if at all, through the imaginary vertical plane.

Optionally, a fail-safe clutch (not shown), providing a mechanical connection between the yoke 28 and the power steering unit 18 can be provided and activated if the electrical steering control fails, due for example to a loss of electrical power. In that case, to allow a greater degree of rotation of the yoke, the limitations on rotation of the yoke can be released for example by deactivating spring-loaded, solenoid-operated stops provided in place of stops 40 and 42.

The encoder 32 provides an electrical input, corresponding to yoke angle θ, to the electronic control unit 24 through a path 44. Another input to the electronic control unit is the vehicle's speed, which can be derived from the vehicle's speedometer and delivered to the control unit through path 46.

Still other inputs to the control unit 24 are derived from accelerometers 48 and 50. Accelerometer 48 is preferably responsive only to acceleration in a plane that is disposed in lateral relation to the vehicle, i.e., to a plane that is horizontal when the vehicle is on a horizontal surface, and tilted when the vehicle is on a banked roadway. Accelerometer 50, on the other hand is preferably responsive to acceleration in a plane that extends vertically in a fore and aft direction when the vehicle is on a horizontal roadway, and tilted when the vehicle is on a banked roadway. From the outputs of these accelerometers, the microprocessor in the control unit can determine the magnitude of the gravitational and inertial forces acting on the vehicle, and thereby determine whether or not the vehicle is approaching a rollover threshold. From these outputs, the microprocessor can also determine the steering angle at which rollover will occur for at the current vehicle speed and bank angle of the roadway.

A rollover condition is reached when the rollover resistance torque is exceeded by the inertial tipping torque. In the case of a vehicle rounding a curve, the rollover resistance torque is the product of the weight of the vehicle and a horizontal moment arm the length of which is the lateral, horizontal, distance from the vehicle's center of gravity to a straight connecting line joining the points at which the front and rear outside wheels contact the road. The tipping torque, on the other hand, is the product of the inertial force acting horizontally on the vehicle's center of gravity and a vertical moment arm the length of which is vertical height of the center of gravity above the above-mentioned connecting line.

If the vehicle is on a level road, the horizontal moment arm will ordinarily be about one-half the distance from the left wheels to the right wheels, and the vertical moment arm will be the distance from the center of gravity of the vehicle to the surface of the road. On the other hand, the lengths of these moment arms will change if the roadway is banked. Thus, on a conventional banked curve, the vehicle's inside wheels will be lower than the outside wheels, and the horizontal moment arm will increase while the vertical moment arm will decrease. Accordingly, the conventional banking of the roadway has the effect of increasing the rollover resistance torque and decreasing the tipping torque, thereby increasing the rollover threshold speed. On the other hand a reverse bank, i.e., a bank such that the outside wheels of the vehicle are lower than the inside wheels, shortens the horizontal moment arm and lengthens the vertical moment arm, decreasing the rollover resistance torque and increasing the tipping torque, thereby decreasing vehicle's rollover threshold speed.

The microprocessor in the control unit, by taking into account the outputs of accelerometers 48 and 50, can determine the inclination of the vehicle, i.e., the bank angle of the roadway, and calculate both the magnitude of the horizontal inertial force acting on the center of gravity and the lengths of the horizontal and vertical moment arms. From this information, it can determine the steering angle at which rollover will occur.

The steering angle ψ, which, in a conventional automobile, is the deviation of the inside front wheel from a its neutral, straight ahead, position, is also the angle at formed by the hypotenuse of a right triangle and a first adjacent side, where the hypotenuse is the radius of curvature of the vehicle's path, the first adjacent side is the distance between the center of curvature of the vehicle's path and the rear wheel, and the second adjacent side is the vehicle's wheelbase. It can be shown that the value of the rollover threshold steering angle $\psi_{RO}$ is given by:

$$\Psi_{RO} = \sin^{-1} \frac{Lg(n + h \tan \beta)}{V^2(h - n \tan \beta)}$$

where: L is the length of the vehicle's wheelbase;
 g is gravitational acceleration;
 n is one half the track width of the vehicle, i.e., one half the distance from the left wheels to the right wheels;
 h is the height of the vehicle's center of gravity CG, i.e. the perpendicular distance from the CG to the roadway;
 V is the vehicle's speed; and
 β is the bank angle of the roadway.

Thus, the microprocessor of the control unit can continuously calculate the value of the rollover threshold steering angle $\psi_{RO}$, and limit the steering angle ψ to a level suitably below the rollover threshold, thus allowing normal control of the vehicle but preventing rollover as a result of a sudden excessive movement of, or force applied to, the steering control.

Alternatively, the gravitational and inertial forces measured by the accelerometers 48 and 50 can be utilized directly to determine that the vehicle is approaching the rollover threshold, by taking into account opposing tipping torque and the rollover resistance torque using the vehicle itself as a frame of reference. In this case, the moment arms are constant, being respectively the values of the distance of the center of gravity from the roadway and half the track distance between the left and right wheels. The forces acting on the center of gravity are then the forces measured directly by the accelerometers, one being in a lateral direction parallel to the roadway and the other being essentially perpendicular to the roadway. Each accelerometer is responsive to a component of the gravitational force and to a component of the inertial force acting on the vehicle. The fact that the vehicle is approaching the rollover threshold can be determined without a separate calculation of the inclination of the vehicle.

Figure 2:
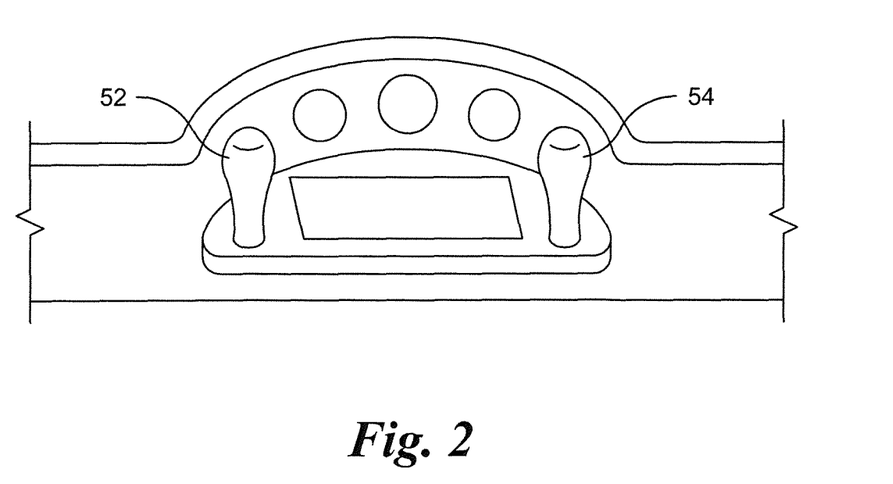
FIG. 2 is a schematic view of an alternative manual operator control in the form of a pair of manually graspable handles that respond to manually exerted force.

In another embodiment, illustrated in FIG. 2, instead of a rotatable yoke, the operator control comprises a pair of handles 52 and 54, graspable respectively by an operator's left and right hands. These handles are coupled either to a position sensor or a strain gauge (not shown), and provide an output which is a function either of control displacement or of the applied force. Various other forms of operator control can also be utilized, including, for example, a single handle (i.e., a form of "joy stick") that can be manipulated by one or both hands of the operator. In any case, however, the range of movement of the operator control should be such that, at least when the control system is operating normally, the vehicle can be steered without the need for the operator to remove his or her hands from a fixed position on the operator control. In the case of a force-responsive handle-type control utilizing a strain gauge, the range of handle movement is almost zero. In the case of a handle-type control, the encoder 26 of FIG. 1, which converts yoke rotation angle to an electrical output, will be replaced by another type of encoder, which provides an electrical output that varies according to handle displacement or applied force.

Whether the operator control is a rotatable yoke-type control as in FIG. 1, or a handle-type control having very little range of movement as in FIG. 2, the electrical output delivered to the electronic control unit 24 is an independent variable θ that corresponds to a manual input provided by the vehicle operator. In the case of a rotatable yoke, θ is the angle through which the yoke is rotated from a neutral condition, and can be positive or negative. In the embodiment shown, θ is positive when the yoke 28 is rotated counterclockwise for a left turn, and negative when the yoke is rotated clockwise for a right turn.

From the input θ, received from the encoder 26 through path 38, the control unit 24 can instantaneously derive time rates of change of the angle θ. These time rates of change can include not only the first and second derivatives, $\dot{\theta}$ and $\ddot{\theta}$, but also the third time derivative $\dddot{\theta}$.

Figure 3:
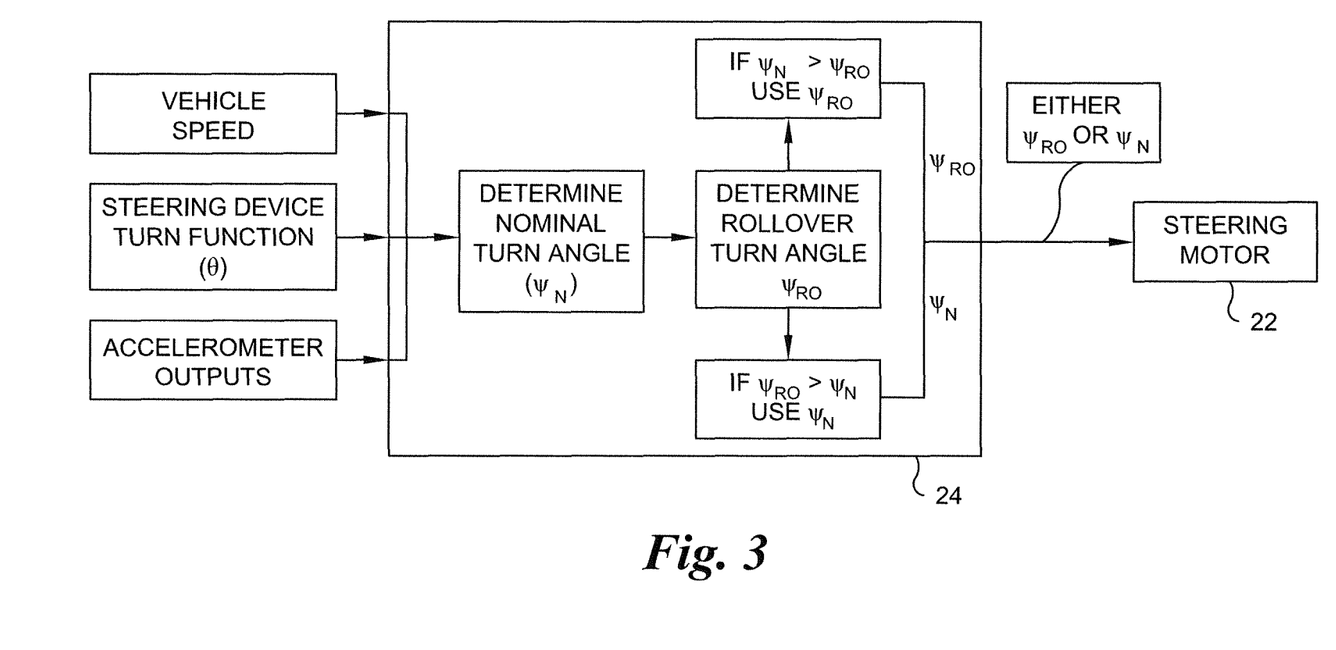
FIG. 3 is a block diagram depicting the operation of a microprocessor which constitutes part of the steer-by-wire control system.

In FIG. 3, which illustrates the operation of the control unit 24 in FIG. 1, the control unit receives three inputs, the vehicle speed from the speedometer, the lateral acceleration of the vehicle and the acceleration perpendicular to the roadway, from the accelerometers 48 and 50, and the steering device turn function θ. The output of the control is the angle ψ through which the outside steering wheel is turned about its steering axis by the power steering unit 18 (FIG. 1) under the control of the steering motor 22.

The relationship between ψ and θ, i.e., the "gain" of the steering system is a function not only of θ, but also of one or more of its time derivatives $\dot{\theta}$, $\ddot{\theta}$, and $\dddot{\theta}$. In addition, the relationship between ψ and θ depends on whether or not the vehicle traveling normally, or beginning to turn so sharply that it is in danger of rolling over.

In normal operation, the microprocessor, utilizing the turning function θ and the vehicle speed, and calculating at least $\dot{\theta}$ and $\ddot{\theta}$, the first and second time derivatives of θ, determines a nominal turn angle $\psi_N$ and controls the steerable wheels accordingly. However, taking into account the vehicle speed, the lateral acceleration and the steering device turn function θ, the microprocessor also continuously makes a determination of whether or not the vehicle is in danger of rolling over, calculating a "rollover turn angle" $\psi_{RO}$. If the nominal turn angle $\psi_N$ exceeds the rollover turn angle $\psi_{RO}$, the turn angle ψ is limited to the value of $\psi_{RO}$, which can be, and ordinarily will be, a value somewhat below the value of ψ at which the inside wheels of the vehicle come out of contact with the roadway.

Because the value of the steering device turn function θ is limited, e.g., to approximately 90° on either side of neutral in the case of a steering yoke as in FIG. 1, the "gain" of the steering control, i.e. relationship between ψ and θ, will be a nonlinear function, and the function itself will change depending not only on the vehicle's speed, but also on the steering device turn function θ, and on time derivatives of θ.

Figure 4:
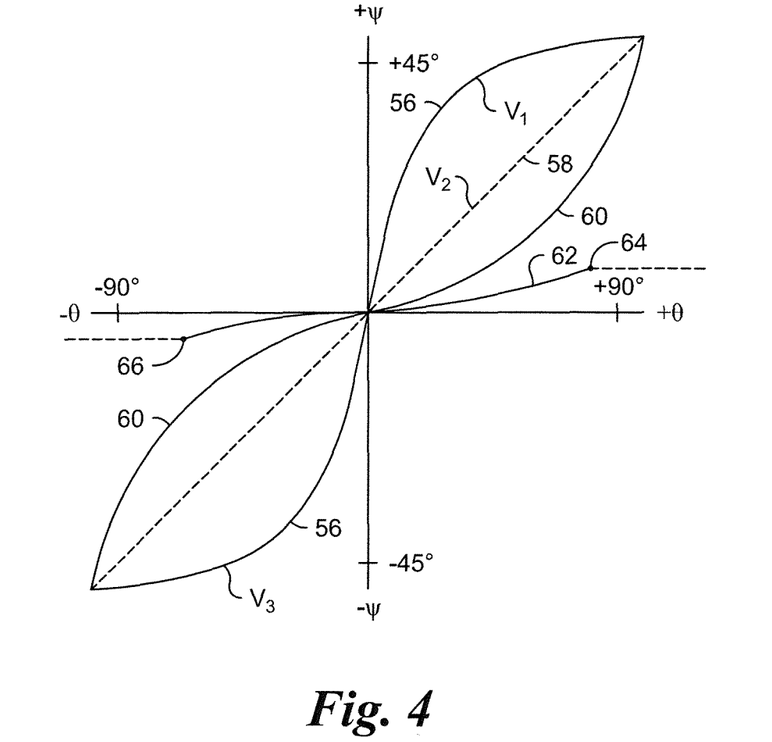
FIG. 4 is a graph illustrating the relationship between road wheel steering angle and the angle of rotation of the steering yoke in FIG. 1.

The instantaneous relationship between ψ and θ can be calculated by the microprocessor in the control unit for every combination of values of vehicle velocity, θ, $\dot{\theta}$, $\ddot{\theta}$, and $\dddot{\theta}$. This relationship will also depend on various vehicle parameters, such as the vehicle's weight, its wheelbase, the height of its center of gravity, etc., as well as on the reactions of the average driver. Thus, the function will vary from one vehicle to another, and at least the refinements on the functional relationship will almost necessarily be determined empirically by experiments carried out by simulations or on a test track. The curves in FIG. 4, are therefore only examples of many possible functional relationships between ψ and θ, there being an infinite number of such curves for each combination of values of V (vehicle velocity), and θ, $\dot{\theta}$, $\ddot{\theta}$, etc. In the control unit 24 (FIG. 1), the instantaneous relationship between ψ and θ can be determined instantaneously by the use of a computer memory functioning as a "look-up table", assigning relatively narrow ranges to each variable, recording a ψ vs. θ function for combinations of ranges, and utilizing software control to smooth the response of the control to changes in θ and in the other variables.

As shown in FIG. 4, curve 56 represents a typical functional relationship between ψ and θ for a given, relatively low vehicle speed $V_1$ and a given set of values of θ, $\dot{\theta}$, $\ddot{\theta}$ and $\dddot{\theta}$. Here, to facilitate parking and turning sharp corners at low speed, for example, the ratio of ψ to θ is relatively high when the steering device is near its neutral position, i.e., when θ is nearly zero. However, the ratio of ψ to θ decreases as the magnitude of θ increases. Thus, the response of the steered wheels to a given movement of the steering control is greater when the steering control is near its neutral condition, and decreases as the steering control is moved away from its neutral condition.

As illustrated by curve 58, it is possible for the relationship between ψ and θ to be linear at an intermediate vehicle speed $V_2$ for a given set of values of $\dot{\theta}$, $\ddot{\theta}$ and $\dddot{\theta}$.

A typical driver of a conventional automobile uses approximately 0-15 degrees of steering wheel motion in order to maintain the automobile on a straight path at relatively high speeds. Any reduction in this allowable movement, regardless of the type of steering device used, can be detrimental to straight line tracking performance. Thus, relatively low gain steering is required at higher speeds. As shown by curve 60, at a higher vehicle speed $V_3$, the change in ψ for a given change in θ is relative low when the steering control is near its neutral condition in order for the vehicle to follow a straight-ahead path without instability resulting from small movements of the operator's hands.

As seen in FIG. 4, when proceeding from a low speed $V_1$ to a higher speed $V_3$, the S-like shape of the curve reverses and the change in ψ for a given change in θ becomes still more gradual when the steering control is near its neutral condition, as illustrated by curve 60, which represents the relationship between ψ and θ for a given vehicle speed $V_3$ and a given set of values for $\dot{\theta}$, $\ddot{\theta}$ and $\dddot{\theta}$. It will be noted, however, that curves 56, 58 and 60, meet at the limits of θ. That is, in the case of a steering yoke limited to rotation through 90° in both directions from its neutral condition, rotation of the yoke to its limit results in the same steering angle, e.g. ψ=45°.

FIG. 4 also illustrates the operation of the control when the vehicle is in danger of rolling over because it is making too tight a turn at too high a speed. Here, curve 62 represents the relationship between ψ and ω at a high speed V4, again for a given set of values for $\dot{\theta}$, $\ddot{\theta}$ and $\dddot{\theta}$. If the input θ exceeds a predetermined value under these conditions, e.g., if the steering yoke is turned so far that ψ approaches an angle such that the vehicle is in danger of rolling over when the lateral acceleration as detected by accelerometer 48 (FIG. 1) is taken into account by the control unit, the commend to the steering motor reverts form $\psi_N$ to $\psi_{RO}$ at point 64 or point 66, and the curve levels off as indicated by the broken lines; an increase in θ, e.g., further turning of the steering yoke, does not result in a further increase in the steering angle ψ.

The response of the control unit to changes in θ depends not only on the vehicle's speed V, but also on one or more time rates of change of θ, i.e., $\dot{\theta}$, $\ddot{\theta}$, and $\dddot{\theta}$. For example, if the steering control is moved rapidly ($\dot{\theta}$ is large), then for most cases, the steering angle should be more responsive to movement of the manual steering controller, i.e., dψ/dθ should increase. Similarly if the rate of movement of the manual steering control is increasing, as it would be in the case where the driver swerves to avoid a suddenly appearing obstacle, i.e., $\ddot{\theta}$ is large, the response curve should be even more steep, i.e., dψ/dθ should be still larger. The controller can be programmed to produce a similar result when $\dddot{\theta}$ is large, though in most cases a change in dψ/dθ in response to a high value of $\dddot{\theta}$ is likely to be less significant. Thus, while the control unit can be made to generate an output responsive to θ, V, lateral acceleration, $\dot{\theta}$, $\ddot{\theta}$ and $\dddot{\theta}$, in some cases it will be sufficient to program the controller so that the output is responsive to θ, V, lateral acceleration, $\dot{\theta}$, and $\ddot{\theta}$, or even responsive only to θ, V, lateral acceleration, and $\dot{\theta}$.

The use of an anti-lock braking systems (ABS) in the vehicle desirable to maximize the effectiveness of the above-described steering control especially under emergency conditions. Whereas road wheel lockup under braking renders it impossible to control vehicle direction, and the vehicle will therefore continue in a straight line, if ABS is utilized, lockup is prevented and the front wheel can continue to be steered. When combined with ABS, the steering control according to the invention with its limited range of control movement and variable gain can enhance the vehicle's crash avoidance capability.

Force feedback, which is conventional in power steering systems, is also desirable so that the driver can sense the "feel of the road" through the operator steering control.

Various modifications can be made to the vehicle and control system of the embodiments described. For example, the system can be made applicable to a vehicle having four steerable wheels, and even to a vehicle in which the steerable wheels are steered by separate motors rather than through a steering linkage. In each case, however, the manually graspable steering control will have a range of movement such that, at least within a limited range of vehicle speeds, steered wheels can be steered through their full angular ranges while an operator's hand remains in fixed, contacting, relationship with the manual steering control.

What is claimed is:

1. In a wheeled vehicle having a set of steered wheels, each of said wheels being steerable through any angle within a limited angular range about a steering axis, a steering system comprising actuator means connected to said steered wheels for steering each of said steered wheels, a manual operator control configured to be graspable by at least one of an operator's left and right hands, an encoder connected to and operable by said manual operator control and providing an output which is a function of an input applied to said manual operator control, said input being the displacement of, or a force applied manually to, said manual operator control, a vehicle speed sensor for sensing speed of travel of the vehicle, a control unit connected to receive the output of said encoder and an output of said vehicle speed sensor, said control unit including a microprocessor and providing a driving output for driving said actuator means, wherein the relationship between said angle about which each of said steered wheels is steered about the steering axis of the last-mentioned one of said steered wheels by said actuator means to the magnitude of the input applied to the manual operator control is a variable dependent upon at least one independent variable including said speed of travel of the vehicle as sensed by said vehicle speed sensor, wherein the input applied to said manual operator control can be varied throughout a range sufficient to cause said steered wheels to be steered through the entirety of said limited angular ranges, at least when said speed of travel the vehicle is within a range from zero to an intermediate speed, while said at least one of an operator's right and left hands remains in fixed, contacting, relationship with said manual operator control.

2. The vehicle according to claim 1, wherein said manual operator control is a yoke rotatable about an axis of rotation and having manually graspable areas on opposite sides of said axis of rotation.

3. The vehicle according to claim 1, wherein said manual operator control is a yoke rotatable about an axis of rotation and having manually graspable areas on opposite sides of said axis of rotation, and wherein the rotation of said yoke is limited to a range of approximately 90° in both directions from a neutral position.

4. The vehicle according to claim 1, wherein said manual operator control is a yoke rotatable about an axis of rotation and having areas configured to be grasped manually by an operator's hands, said areas being respectively on opposite sides of said axis of rotation, and wherein the rotation of the yoke is limited to a range such that when said areas of the yoke are respectively grasped by an operator's hands, said areas remain at all times substantially on respective opposite sides of an imaginary plane in which said axis of rotation lies.

5. The vehicle according to claim 1, including means for measuring roll torque acting on said vehicle, and wherein the microprocessor of said control unit is programmed to override said driving output of the control unit when the magnitude of roll torque acting on said vehicle as a result of lateral acceleration of the vehicle exceeds a value that is below a rollover threshold by a predetermined amount.

6. The vehicle according to claim 1, including a first accelerometer arranged to provide an accelerometer output representative of the magnitude of the force acting on the vehicle in a lateral direction, and a second accelerometer arranged to provide an accelerometer output representative of the magnitude of the force acting on the vehicle in a direction perpendicular to said lateral direction, both said accelerometers being connected to deliver their accelerometer outputs to said control unit, and wherein the microprocessor of said control unit is programmed to override said driving output of the control unit when the magnitudes of said forces are such that torque acting on said vehicle as a result of said forces exceeds a value that is below a rollover threshold by a predetermined amount.

7. The vehicle according to claim 1, wherein the magnitude of the input applied to the manual operator control is able to change with time so that said magnitude has a time rate of change, and wherein the relationship between said angle about which each of said steered wheels is steered about said steering axis of the last-mentioned one of said steered wheels by said actuator means to the magnitude of the input applied to the manual operator control is a variable dependent not only upon the speed of travel of the vehicle but also upon said time rate of change of the magnitude of the input applied to the manual operator control.

8. The vehicle according to claim 1, wherein the magnitude of the input applied to the manual operator control is able to change with time so that said magnitude has both a time rate of change and a second time derivative, and wherein the relationship between said angle about which each of said steered wheels is steered about said steering axis of the last-mentioned one of said steered wheels by said actuator means to the magnitude of the input applied to the manual operator control is a variable dependent not only upon the speed of travel of the vehicle but also upon said time rate of change of the magnitude of the input applied to the manual operator control and upon said second time derivative of the magnitude of the input applied to the manual operator control.

9. The vehicle according to claim 1, including an accelerometer arranged to measure roll torque acting on said vehicle, and wherein the microprocessor of said control unit is responsive to an output of said accelerometer and programmed to override said driving output of the control unit when the magnitude of roll torque acting on said vehicle as a result of lateral acceleration of the vehicle exceeds a value that is below a rollover threshold by an predetermined amount.

10. In a wheeled vehicle having a set of steered wheels, each of said wheels being steerable through any angle within a limited angular range about a steering axis, a steering system comprising an actuator connected to said steered wheels for steering each of said steered wheels, a manual operator control configured to be graspable by at least one of an operator's left and right hands, an encoder connected to and operable by said manual operator control and providing an output which is a function of an input applied to said manual operator control, said input being the displacement of, or a force applied manually to, said manual operator control, a vehicle speed sensor for sensing speed of travel of the vehicle, a control unit connected to receive the output of said encoder and an output of said vehicle speed sensor, said control unit including a microprocessor and providing a driving output for driving said actuator, wherein the relationship between said angle about which each of said steered wheels is steered about the steering axis of the last-mentioned one of said steered wheels by said actuator to the magnitude of the input applied to the manual operator control is a variable dependent upon at least one independent variable including said speed of travel of the vehicle as sensed by said vehicle speed sensor, wherein the input applied to said manual operator control can be varied throughout a range sufficient to cause said steered wheels to be steered through the entirety of said limited angular ranges, at least when said speed of travel of the vehicle is within a range from zero to an intermediate speed, while said at least one of an operator's right and left hands remains in fixed, contacting, relationship with said manual operator control.

11. The vehicle according to claim 10, wherein said manual operator control is a yoke rotatable about an axis of rotation and having manually graspable areas on opposite sides of said axis of rotation.

12. The vehicle according to claim 10, wherein said manual operator control is a yoke rotatable about an axis of rotation and having manually graspable areas on opposite sides of said axis of rotation, and wherein the rotation of said yoke is limited to a range of approximately 90° in both directions from a neutral position.

13. The vehicle according to claim 10, wherein said manual operator control is a yoke rotatable about an axis of rotation and having areas configured to be grasped manually by an operator's hands, said areas being respectively on opposite sides of said axis of rotation, and wherein the rotation of the yoke is limited to a range such that when said areas of the yoke are respectively grasped by an operator's hands, said areas remain at all times substantially on respective opposite sides of an imaginary plane in which said axis of rotation lies.

14. The vehicle according to claim 10, including means for measuring roll torque acting on said vehicle, and wherein the microprocessor of said control unit is programmed to override said driving output of the control unit when the magnitude of roll torque acting on said vehicle as a result of lateral acceleration of the vehicle exceeds a value that is below a rollover threshold by a predetermined amount.

15. The vehicle according to claim 10, including a first accelerometer arranged to provide an accelerometer output representative of the magnitude of the force acting on the vehicle in a lateral direction, and a second accelerometer arranged to provide an accelerometer output representative of the magnitude of the force acting on the vehicle in a direction perpendicular to said lateral direction, both said accelerometers being connected to deliver their accelerometer outputs to said control unit, and wherein the microprocessor of said control unit is programmed to override said driving output of the control unit when the magnitudes of said forces are such that torque acting on said vehicle as a result of said forces exceeds a value that is below a rollover threshold by a predetermined amount.

16. The vehicle according to claim 10, wherein the magnitude of the input applied to the manual operator control is able to change with time so that said magnitude has a time rate of change, and wherein the relationship between said angle about which each of said steered wheels is steered about said steering axis of the last-mentioned one of said steered wheels by said actuator to the magnitude of the input applied to the manual operator control is a variable dependent not only upon the speed of travel of the vehicle but also upon said time rate of change of the magnitude of the input applied to the manual operator control.

17. The vehicle according to claim 10, wherein the magnitude of the input applied to the manual operator control is able to change with time so that said magnitude has both a time rate of change and a second time derivative, and wherein the relationship between said angle about which each of said steered wheels is steered about said steering axis of the last-mentioned one of said steered wheels by said actuator to the magnitude of the input applied to the manual operator control is a variable dependent not only upon the speed of travel of the vehicle but also upon said time rate of change of the magnitude of the input applied to the manual operator control and upon said second time derivative of the magnitude of the input applied to the manual operator control.

18. The vehicle according to claim 10, including an accelerometer arranged to measure roll torque acting on said vehicle, and wherein the microprocessor of said control unit is responsive to an output of said accelerometer and programmed to override said driving output of the control unit when the magnitude of roll torque acting on said vehicle as a result of lateral acceleration of the vehicle exceeds a value that is below a rollover threshold by a predetermined amount.

* * * * *